Figure 1:
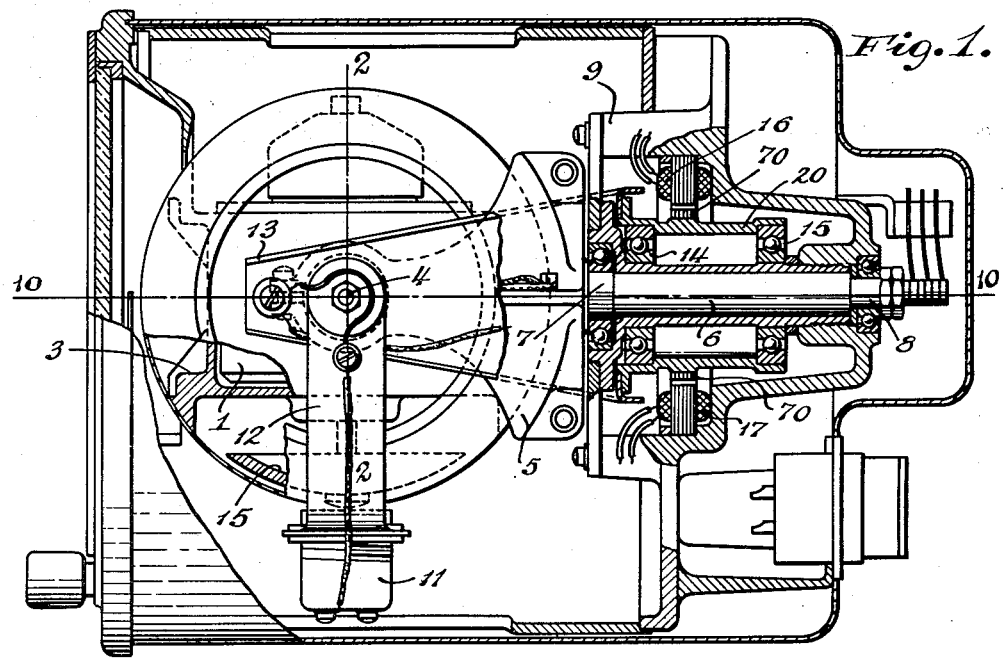

July 15, 1952 W. WRIGLEY 2,603,094
GYROSCOPIC ARTIFICIAL HORIZON
Filed Nov. 11, 1944 2 SHEETS—SHEET 1

INVENTOR
WALTER WRIGLEY
BY
Herbert H. Thompson
ATTORNEY.

July 15, 1952 W. WRIGLEY 2,603,094
GYROSCOPIC ARTIFICIAL HORIZON
Filed Nov. 11, 1944 2 SHEETS—SHEET 2

INVENTOR
WALTER WRIGLEY

Patented July 15, 1952

2,603,094

UNITED STATES PATENT OFFICE 2,603,094

GYROSCOPIC ARTIFICIAL HORIZON

Walter Wrigley, East Hempstead, N. Y., assignor to The Sperry Corporation, a corporation of Delaware Application November 11, 1944, Serial No. 563,065

6 Claims. (Cl. 74—5.41)

This invention relates to means for indicating continuously in a ship, aircraft or other dirigible vehicle a vertical straight line passing through the center of the earth so as to give a datum for navigation and/or other purposes such as for the control of artillery. The invention is intended chiefly for use in high speed aircraft and is concerned with that class of instrument in which a gyroscopic system is used as a steadying and integrating element to indicate the vertical and is subject to a controlling device such as a pendulum or level directly acted on by the force of gravity. Unfortunately, such instruments respond not only to the accelerations of the earth's gravitation, but also to accelerations produced by changes of speed or course of the ship over the earth's surface, and also to centrifugal accelerations caused by the earth's rotation when the instrument is being carried by the craft along a path curved to follow the earth's surface. All these accelerations combine vectorially with the vertical acceleration of terrestrial gravity to give a resultant in a direction different from that of the true vertical and hereinafter referred to as "the dynamical vertical." Any pendulum or level device in a steady state can indicate only the dynamical vertical unless special means are introduced as hereinafter described to correct it to the true vertical.

Accelerations due to short period changes in speed and/or course of the craft, as well as those due to rolling or pitching are necessarily evanescent and seldom persist in any given direction for more than a few minutes. In other words, the summation of all accelerations due to these causes tends to zero over a period of say 5 minutes of time. Consequently, if the gyroscopic system is made very slowly responsive to changes in the dynamical vertical, as for instance by giving it a long period with heavy damping, it will be only slightly deflected by such evanescent accelerations. The art of constructing such long period, heavily damped devices is well known; see, for instance, the patent to O. E. Esval No. 2,293,039 dated June 5, 1940.

On the other hand, accelerations due to the earth's rotation combined with the motion of the craft over the earth's curved surface at constant velocity (sometimes called Coriolis accelerations) may persist indefinitely and no averaging or integrating device is known to eliminate their effects on a vertical-indicating instrument. It is the object of the present invention to provide means first for automatically computing the deviation of the dynamical vertical due to these causes; and secondly, for introducing a proper compensation automatically so that the indications of the instrument may show the true vertical.

The effect of the above-mentioned Coriolis accelerations on a pendulum being carried at a uniform speed and on a straight line over the earth's surface is to make the pendulum hang with its lower end slightly to the right or left in a plane at right angles to its course. In the Northern Hemisphere it will be displaced to the right hand of a person looking in the direction of travel and in the Southern Hemisphere to the left. The magnitude of this deviation is proportional to the product of the linear velocity of travel and the sine of the latitude where the observation is made. If the course of travel of the pendulum is curved instead of straight, there will be a further transverse acceleration proportional to the product of the linear velocity multiplied by the rate of change of the course, generally called rate of turn. Systems and means for computing the deviation of the dynamical vertical from these data and for correcting the indications of the gyroscopic system, either directly or through the controlling pendulum or level or other vertical references, by the amount so computed, are herein provided.

A further feature of the invention relates to the method by which the position of the gyroscope is corrected for any disturbing accelerations due to motions of the craft on which it is mounted. According to one form of my invention I propose to apply a corrective torque in the first instance to the gravitation controller, or pendulum, rather than to the gyroscope. By this means I avoid errors due to variations in speed of the gyro rotor and also am able to employ smaller torque-applying devices. In some cases, however, I may prefer to apply the corrective torque directly to the gyroscopic system.

Figure 2:
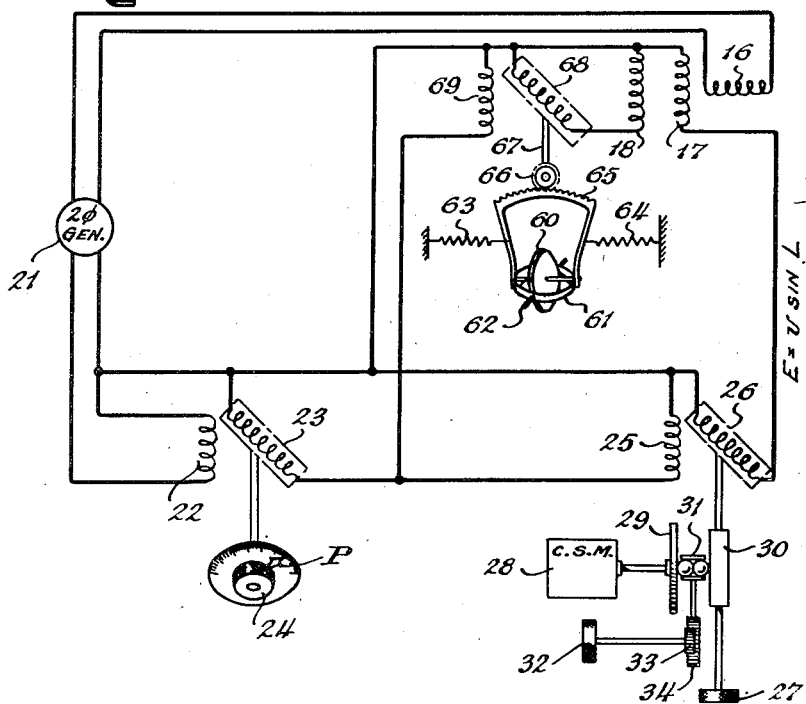
Figure 3:
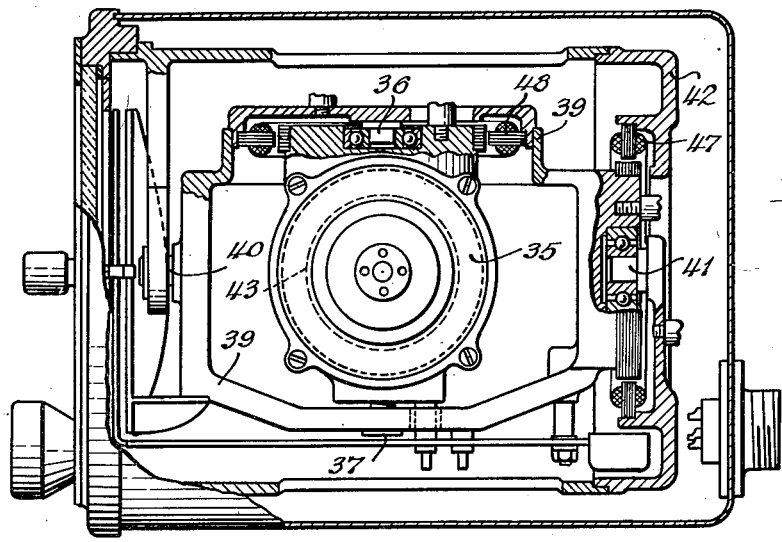
Figure 4:
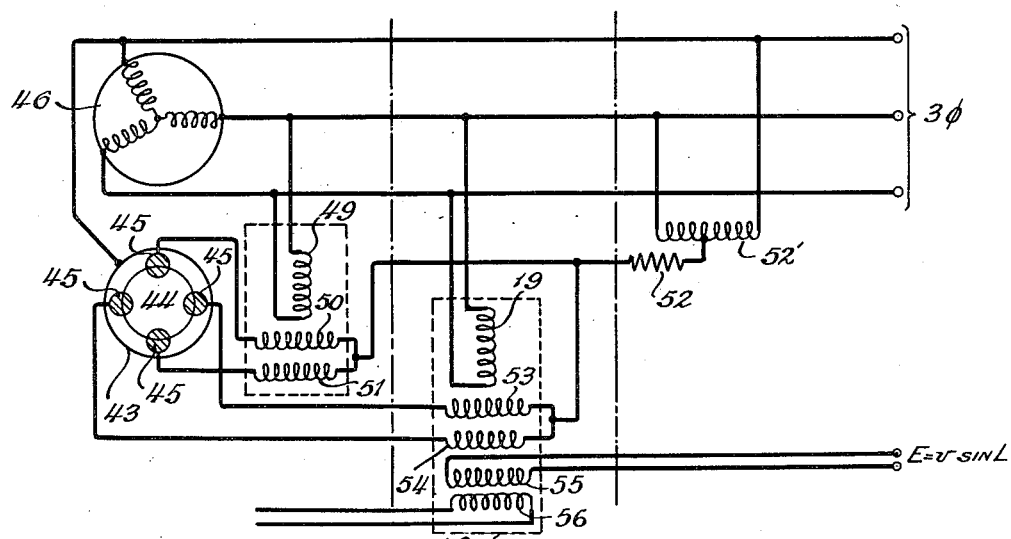

In order that my invention, and the manner of carrying it into effect, may be more clearly ascertained, reference is had to the accompanying drawings in which Figure 1 is a side elevation, partly in section, of one form of gyro vertical embodying my invention. Figure 2 is a wiring diagram of a computer portion of the invention for obtaining the torque which is a function of the speed, latitude and rate of turn of the craft. Figure 3 is a plan, partly in section, of a gyro vertical showing a modified form of my invention. Figure 4 is a wiring diagram of Figure 3.

I have shown my invention as applied to a gyroscopic horizon instrument in which the gyroscopic system consists of a single gyroscope with its spin axle normally vertical, but it will be obvious that it is equally applicable to gyroscopic systems with a plurality of gyroscopes having their spin axles normally in horizontal or other directions.

Referring now to Figure 1, the rotor 1 of the gyroscope adapted for rapid rotation about a normally vertical axis 2, 2 is supported in a casing 3. Casing 3 is pivotally mounted so as to be free to swing round an axis 4 hereinafter called the "pitch axis," in a fork 5. Said fork is integral with a horizontal shaft 6 free to turn in ball bearings 7, 8 in the frame 9, round the horizontal axis 10, 10, hereinafter called the "roll axis." The casing containing the spinning gyro is thus free to swing round any horizontal axis, so that the gyro axle may remain vertical in spite of roll or pitch of the craft. The outer frame 9 of the instrument is fixed rigidly to the craft.

The vertical attitude of the gyro axle is controlled by a pendulum consisting of a bob 11 carried by a yoke piece of Y-shape 12 carried by bearings in the bracket 13 which extends on both sides of the gyro case outside the fork 5. The pendulum bob is therefore also able to swing round axis 4 normally coincident with the pitch axis on which the gyro casing is pivoted in fork 5. The bracket 13 which supports the pendulum is mounted on bearings 14, 15 so that it is capable of independent rotation about the roll axis 10, 10. The pendulum is therefore free to swing in any direction and normally hangs vertical with its bob under the center of the gyro casing.

The bob 11 contains an electromagnet (not shown) constantly excited from a source of direct current and producing a substantially vertical magnetic field in the space just above it. A downward extension of the spin axle of the gyro carries a saucer shaped piece 15 formed as part of a sphere which spins with the gyro about a normally vertical axis in said magnetic field.

The saucer 15 is made of aluminum or other electrically conducting substance in which Foucault currents are induced as it spins in the magnetic field of the pendulum. The interaction between these Foucault currents and the magnetic field causes a mechanical drag or resistance to the spin of the saucer. So long as the saucer is accurately centered over the pendulum bob 11 the drag merely acts as a brake and retards the gyro spin round axis 2, 2 by a small amount which in practice does not interfere with the operation of the instrument. But if the gyro tilts relatively to the pendulum the drag will have a component about either or both of the horizontal axes 4 and 10, 10 in such a sense as to cause the gyro to precess and align its axle with the vertical magnetic field of the pendulum 11.

Since the force of this drag is comparatively small, the rate of precession of the gyro in following the pendulum is very slow, and the gyro will not respond to any substantial extent to short-lived deviations of the pendulum but will align itself to the mean vertical as shown by the pendulum. To correct for the persistent deviation of the pendulum due to Coriolis accelerations I provide a torque producing system capable of applying to the bracket 13 which carries the pendulum a couple just sufficient to swing it round the roll axis 10, 10 to the true vertical position. This consists of an induction motor with a squirrel-cage or short-circuited rotor and a two-phase wound stator. The stator and coils, shown at 16, 17, are rigidly carried on the main frame 9 of the instrument, while the squirrel-cage 70 is fixed to the sleeve 20 which carries the bracket 13 supporting the pendulum. Such induction torque motors are well known in the art and are therefore not described in full detail herein. In the present example, one of the two stator windings is fed from one phase of a two-phase generator at a fixed voltage and frequency; the other winding, described hereinafter with reference to Figure 2, is supplied from the second phase of the generator through variable ratio transformers which vary phase and voltage so that the actual couple applied to the rotor is proportional to the correction required in the position of the pendulum. This couple is then transmitted through the bracket 13 to the pendulum.

In order that said couple shall have the necessary effect to compensate for the Coriolis tilt of the pendulum, two conditions must be observed. First, the couple must be applied around an axis lying in the direction of travel of the craft; and second, the couple must be proportional, as already set forth herein, to the product of the speed of the craft times the sine of the angle of latitude. The first condition is satisfied by mounting the instrument in the craft with the horizontal roll axis 10, 10 lying in the fore and aft direction. The second condition is met by means now to be described with reference to Figure 2 which shows diagrammatically the electrical connections in the instrument.

The two windings 16 and 17 of the stator of the torque motor are connected as shown in Figure 2. Winding 16 is the fixed phase winding fed directly from one phase of the generator 21. The winding 17 which is disposed in quadrature with 16 is fed from the second phase of generator 21 by a current of the same frequency but differing 90° in phase from the current supplied to winding 16 of the torque motor. Said second phase of generator 21 feeds the primary 22 of a variable ratio transformer, the secondary coil 23 of which is manually rotatable by the knob 24 so that the secondary voltage is proportional to $v$, the speed of the craft. A pointer P on the shaft of knob 24 and moving over a scale calibrated in knots or miles per hour enables this setting to be made, or if desired the knob may be turned from any speed responsive device such as an air speed motor.

This voltage, $v$, is now fed into the primary 25 of a similar variable ratio transformer, the secondary coil 26 of which is rotated from the null position (at right angles to 25) by an angle proportional to the latitude L. The voltage given by this secondary coil is therefore proportional to $v \sin L$, and is transmitted to winding 17 of the induction motor. Since the torque of this induction motor is proportional to the product of the currents in the two stator windings, said torque will be proportional to $v \sin L$ as required and will swing the pendulum 11 out of the false or Coriolis vertical to the true vertical.

The secondary coil 26 may be rotated by hand to the latitude L by use of the knob 27. However, a high speed airplane may vary its latitude very quickly, and to obviate continual resetting by hand I prefer to use the mechanism shown in Figure 2. This consists of a constant speed motor 28 which drives disk 29. Said disk drives a roller 30 on the same shaft as knob 27 in a well known manner through two balls in a cage 31. The speed at which the roller is driven depends on the radial distance of the ball cage from the center of disk 29. This distance can be adjusted by knob 32 through pinion 33 and rack 34 so that at the given speed and course, the angular setting of secondary coil 26 will continuously and automatically correspond with the latitude of the craft.

If the craft is not pursuing a straight course but turning, say in an arc of a circle, there will be an additional transverse acceleration added algebraically to the Coriolis acceleration. Unless opposed by an addition couple, this will cause the pendulum 11 to swing towards the convex side of the path. I may therefore arrange to apply to the pendulum an opposing couple equal and opposite to the turn acceleration force on the pendulum, i. e., a couple, proportional to the moment of the pendulum, and to the linear speed and angular rate of turn of the craft.

This is accomplished by an additional coil 18 wound on the stator of the induction motor in the same slots as the coil 17 already referred to. Coil 18 is fed with a voltage which varies as the speed and rate of turn of the craft.

The manner of obtaining this voltage is shown in Figure 2. A rate of turn gyro of the conventional type is shown at 60. This consists of a gyro spinning with horizontal axis in a frame 61 mounted so as to be able to rotate round horizontal axis 62 (which is at right angles to the gyro axle) against the restraint of springs 63, 64. The angle of rotation round this axis against the spring restraint gives a measure of the rate of turn of the craft which carries it. Attached to the frame 61 is a tooth sector 65 driving a pinion 66 on a shaft 67 which carries coil 68 forming the secondary of another variable ratio transformer. The primary 69 of the transformer is fed with current proportional to the speed of the craft from coil 23 of variable transformer 22—23 set from speed knot 24 in parallel with the primary 25 of the latitude transformer. The output of the secondary coil 68 is therefore proportional to the product of speed times rate of turn and this is added by the coil 18 in the induction motor to the effect of coil 17 so that the total torque delivered by the motor to the pendulum corrects for both the Coriolis acceleration and the centrifugal acceleration due to the curved path of the craft.

An alternative method of carrying my invention into effect is shown in Figures 3 and 4.

Figure 3 is a plan view of a vertical axle gyro, the casing 35 of which is carried in horizontal trunnions 36, 37 forming the pitch axis, in a gimbal ring 39 which can rock round horizontal trunnions 40, 41 forming the roll axis, in a frame 42 fixed to the ship.

In lieu of the pendulum of the previous example I use a liquid level mounted directly on the casing of the gyroscope. This level is seen in plan in the diagram of Figure 4 and consists of a cylindrical case 43 with walls of electrically conducting material and with a slightly domed top of nonconducting material. This case is partly filled with a high resistance conducting liquid leaving a bubble 44 of air or other gas. Four small disks 45 of conducting metal are inlaid in the inner surface of the domed top of the cylinder and connected to terminals exterior to the level so that they may be joined to other parts of the apparatus as hereinafter described.

So long as the level is maintained in a horizontal position, the bubble will be central in the case, as shown in the drawing, and the liquid will make equal contact with each of the four disks 45. If the level is tilted, as a result of tilting of the gyro-casing which carries it, the bubble will move to an eccentric position and the conducting paths through the liquid from the case 43 to the four disks 45 respectively will have different ohmic resistances.

The gyro is spun by a three-phase motor as before, the stator windings of the motor being shown at 46 in Figure 4 as fed from an external source of three-phase currents.

The frame 42 carries an induction-type torque motor, the stator of which is shown at 47. The rotor is attached to the gimbal ring 39 so that when the motor is energized, a couple is applied to the gyro round the roll axis 40, 41.

A similar torque motor has its stator 48 mounted on the gimbal ring 39 of the instrument and its rotor is attached to gyro casing 35 so as to be capable of applying a couple to the gyro round the pitch axis 36, 37.

Each of these torque motors has a two-phase stator and operates similarly to the motor already described herein with reference to Figures 1 and 2. Referring to Figure 4, the constant phase of the windings of stator 47 which works on the roll axis, is shown at 49 and is fed from one phase of the three-phase source. The second phase of the stator consists of two coils 50, 51 wound in opposition to each other. These two coils have a common connection through resistance 52 to a phase adjusting inductance 52' connected to another phase of the three-phase supply. The other terminals of the coils are respectively connected to two opposite disks 45 of the liquid level, the case of which is connected to the A. C. supply as shown.

So long as the bubble in the level is central, coils 50, 51 will receive equal currents, and being oppositely wound will have no effect on the rotor of the motor. If, however, the gyro is tilted round the pitch axis 36, 37 the bubble will be displaced, say downward in the diagram, and more current will flow through coil 50 than through 51. The phase of this current will be in quadrature with that of the constant coil 49 and the motor will therefore apply a couple to the gyro round the roll axis 40, 41 causing it to precess back to the vertical position and centralize the bubble in the level carried on the gyro casing.

The torque motor on the pitch axis is similar to that just described for the roll axis. Its stator 48 has a constant phase coil 19 and two oppositely wound coils 53, 54 constituting the second phase winding and connected to the other two disks 45 in the level. This motor therefore serves in the same manner to cause precession of the gyro to the upright position after it has been deflected round the roll axis. Stator 48 has, however, a third coil 55 which is fed with a voltage proportional to $v \sin L$ by means already described with reference to Figure 2.

The manner of operation of the device to correct the attitude of the gyro for the Coriolis effect is as follows.

When the craft is under way, the dynamical vertical will be inclined to the right (say) of the true vertical, and the level will only have its bubble central so long as it is equally tilted from the true vertical. If, however, the gyro axle remains in the true vertical, and keeps the level in the true horizontal, the Coriolis acceleration will cause the bubble to be displaced from its central position. This will cause one of the coils 53, 54 to overpower the other and produce a couple proportional to the tilt which, unless resisted, would act on the gyro and cause it to precess into the Coriolis vertical. At the same time, however, the voltage $v \sin L$ in coil 55 will produce an equal opposing couple which will keep the gyro axle in the true vertical although the level bubble continues to show the deviation of Coriolis. Particularly I wish to point out that my improved method disclosed in Figs. 1 and 2 for preventing deviation of a gyro vertical due to the motion of the vehicle on which it is mounted by applying a compensating force directly to the gravitational controller, or pendulum, rather than to the gyroscope, is not confined to the correction of the Coriolis error but is applicable to the correction of ordinary transient error due to turns, etc. Thus, for preventing turning errors I have shown in Fig. 2 a means for generating a counteracting torque for the pendulum controller proportional to the rate of turn and speed of the vehicle on which the device is mounted, a signal proportional to the rate of turn being generated by the rate of turn gyroscope 60 and a compensating signal proportional to speed being generated by the transformer winding 23, settable either automatically, or by hand, from a speed knob 24.

Similar means may be provided in the arrangement of Figs. 3 and 4 for correcting or preventing these turning errors. For example, this means may include an additional coil 56 in the torque motor 48 that is supplied with a voltage made to vary according to the speed and rate of turn of the craft in the same manner as coil 16 in Fig. 2.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic artificial horizon or gyro vertical for high speed dirigible craft, the combination of, a universally supported gyroscopic rotor case, a torque exerting erector including a tilt detecting controller having two relatively movable elements, one of which is mounted on the case and the other of which is freely mounted and responsive to gravitational acceleration, means for generating a signal in accordance with the effect of Coriolis on the gravitationally responsive element of said controller due to the speed and latitude of the craft, means for generating a second signal in accordance with the effect of lateral acceleration on the gravitationally responsive element of said controller during turns of the craft, means for combining the signals of said first and second signal means, and means operatively connecting said combining means and one of the elements of the controller to correct the erector for the Coriolis effect and for the effect of lateral accelerations during turns.

2. In a gyroscopic artificial horizon or gyro vertical for high speed dirigible craft, the combination of, a universally supported rotor case, a torque exerting erector including a tilt detecting controller having two relatively movable elements, one of which is mounted on the case and the other of which is a pendulum, means for computing the effect of Coriolis on said pendulum in accordance with the speed and latitude of the craft, and a torquing means connecting said pendulum and said computing means for correcting the pendulum for the Coriolis effect.

3. In a gyroscopic artificial horizon or gyro vertical for high speed dirigible craft, the combination of, a universally supported rotor case, a torque exerting erector including a tilt detecting liquid level switch mounted on the case, means for computing the effect of Coriolis on said liquid level switch in accordance with the speed and latitude of the craft, and torquing means connecting said case and computing means for correcting the liquid level switch for the Coriolis effect.

4. As a means for preventing tilt due to the Coriolis effect in a gyro vertical for dirigible craft, erecting means for the gyro vertical including a controller having an element fixed to the gyro vertical and a pendulous element, means for applying a torque about the fore and aft axis of the gyro vertical operatively connected to said pendulous element, and means for operating said torque applying means in accordance with the speed and latitude of the craft.

5. As a means for preventing tilt due to the Coriolis effect in a gyro vertical for dirigible craft, erecting means for the gyro vertical including a liquid level switch controller fixed to the gyro vertical, means for applying a torque about the pitch axis of the gyro vertical, and means for operating said torque applying means in accordance with the speed and latitude of the craft.

6. In a gyroscopic artificial horizon or gyro vertical for high speed dirigible craft, the combination of, a universally supported rotor case, a torque exerting erector including a tilt detecting liquid level switch fixedly mounted on the case, means for computing the effect of lateral acceleration on said switch during turns of the craft in accordance with the speed and rate of turn of the craft, and torquing means connecting said case and computing means for correcting the gyro vertical for the effect of lateral acceleration on the switch.

WALTER WRIGLEY.

REFERENCES CITED

The following references are of record in the file of this patent:

UNITED STATES PATENTS

| Number | Name | Date |
|---|---|---|
| 1,984,874 | Gillmor et al. | Dec. 18, 1934 |
| 2,293,039 | Esval | Aug. 18, 1942 |
| 2,293,092 | Wittkuhns | Aug. 18, 1942 |
| 2,411,087 | Ford | Nov. 12, 1946 |
| 2,419,063 | Fischer | Apr. 15, 1947 |
| 2,427,158 | Poitras et al. | Sept. 9, 1947 |